United States Patent [19]
Faye

[11] Patent Number: 6,147,600
[45] Date of Patent: *Nov. 14, 2000

[54] SYSTEM FOR GENERATING A SIGNAL FOR ACTIVATING THE BRAKE LIGHTS OF A MOTOR VEHICLE

[75] Inventor: Ian Faye, Stuttgart, Germany

[73] Assignee: Robert Bosch GmbH, Stuttgart, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/283,686

[22] Filed: Apr. 1, 1999

[30] Foreign Application Priority Data

Apr. 1, 1998 [DE] Germany ............................ 198 14 574

[51] Int. Cl.$^7$ ..................................................... B60Q 1/50
[52] U.S. Cl. .......................... 340/467; 340/463; 340/464; 340/468; 340/469; 340/466; 340/479
[58] Field of Search ..................................... 340/464, 466, 340/467, 479, 435, 439, 576, 903, 463, 468

[56] References Cited

U.S. PATENT DOCUMENTS

| | | | |
|---|---|---|---|
| 5,387,898 | 2/1995 | Yeheskel et al. | 340/479 |
| 5,481,243 | 1/1996 | Lurie et al. | 340/467 |
| 5,589,817 | 12/1996 | Furness | 340/467 |
| 5,781,103 | 7/1998 | Gilling | 340/441 |
| 5,801,624 | 9/1998 | Tilly et al. | 340/479 |
| 5,864,285 | 1/1999 | Wieder et al. | 340/435 |
| 5,955,941 | 9/1999 | Pruksch et al. | 340/435 |

FOREIGN PATENT DOCUMENTS

| | | |
|---|---|---|
| 39 06 726 | 9/1990 | Germany. |
| 91 08 827 | 12/1991 | Germany. |
| 42 131 48 | 11/1992 | Germany. |
| 41 39 215 | 6/1993 | Germany. |
| 43 35 979 | 4/1995 | Germany. |
| 297 09 110 U | 9/1997 | Germany. |

OTHER PUBLICATIONS

Hermann Winner et al.,"Adaptive Cruise Control, System Aspects and Development Trends," SAE Paper No. 961010.
Automobiltechnische Zeitschrift [Automotive Technology Journal] '96 (1994) "FDR—Fahrdynamikregelung von Bosch" [FDR—Driving dynamics control by Bosch].

*Primary Examiner*—Jeffery A. Hofsass
*Assistant Examiner*—Hung Nguyen
*Attorney, Agent, or Firm*—Kenyon & Kenyon

[57] ABSTRACT

A system generates a signal to activate the brake lights of a motor vehicle. An accelerator pedal position change parameter is determined, which represents the variation over time of the accelerator pedal that can be actuated by the driver. This accelerator pedal position change parameter is compared with at least one predefinable threshold value. The signal for activating the brake lights is then generated as a function of this comparison. The threshold value is predefined as a function of at least one stability/safety parameter, which represents the instantaneous driving stability of the vehicle and/or the instantaneous driving safety of the vehicle. The method and the device provide an improved means to warn the trailing vehicles of an impending hazard (for example, an obstacle, skidding of the vehicle or a slippery road surface) via the brake lights in a timely and reliable manner.

19 Claims, 1 Drawing Sheet

SYSTEM FOR GENERATING A SIGNAL FOR ACTIVATING THE BRAKE LIGHTS OF A MOTOR VEHICLE

FIELD OF THE INVENTION

The present invention relates to a system for generating a signal to activate the brake lights of a motor vehicle.

BACKGROUND INFORMATION

SAE paper No. 961010, "Adaptive Cruise Control, System Aspects and Development Trends" by Hermann Winner et al., describes an adaptive cruise control. The adaptive cruise control is equipped with sensors for detecting obstacles located in front of the vehicle. The adaptive cruise controller detects the distance to the obstacles located in front of the vehicle and their relative speed. It selects, as a function of additional sensor signals, the closest obstacle and, if necessary, reduces the speed of the cruise speed of the vehicle equipped with the adaptive cruise control.

In the ATZ—Automobiltechnische Zeitschrift [Automotive Technology Journal] '96 (1994) article "FDR—Fahrdynamikregelung von Bosch" [FDR—Driving dynamics control by Bosch], a system is presented in which the yaw rate of the vehicle is measured and compared with a target value derived from the longitudinal speed and the steering angle of the vehicle. If the measured yaw rate exceeds the corresponding target value, the yaw characteristics of the vehicle can be influenced using wheel-individual overbraking or underbraking and/or intervention in the engine controller in order to increase driving stability. Furthermore, it is known from the ATZ article that the friction coefficient between the road surface and the vehicle tires can be estimated from the estimated longitudinal velocity and the measured transversal acceleration.

In conventional vehicles, the brake lights are in general activated as a direct function of a brake pedal actuation.

German Utility Model No. GM 91 08 827 shows a signaling device for controlling a brake light in a motor vehicle, where the position of the accelerator pedal, actuated by the driver of the vehicle, is evaluated to determine a sudden decrease in the vehicle acceleration. A moderate easing on the accelerator pedal, as occurs under normal conditions, does not trigger brake light activation, while in the case of a sudden let-up on the accelerator pedal, such as occurs in the event of emergency braking, the brake lights are activated. The selection of the accelerator pedal position at which brake light activation takes place always represents a compromise between the avoidance of an unnecessary activation of the brake lights in the event where no emergency braking follows the easing on the accelerator pedal and the necessary activation of the brake lights in the event where the accelerator pedal position change is followed by emergency braking.

SUMMARY OF THE INVENTION

An object of the present invention is to generate a signal for activating the brake lights that provides an early signal of a hazard situation.

As mentioned above, the present invention relates to a method and a device for generating a signal for activating the brake lights of a motor vehicle. An accelerator pedal position change quantity, which represents the change over time in the position of the pedal that can be actuated by the driver, is determined. This determined accelerator pedal change quantity is compared with at least one predefinable threshold value. The signal for activating the brake lights is then generated as a function of this comparison.

According to the present invention, the threshold value is predefined as a function of at least one stability/safety parameter, which represents the instantaneous driving stability of the vehicle or the instantaneous driving safety of the vehicle. The present invention provides an improved method for warning, in a timely and reliable manner, the trailing vehicles of an imminent hazard (for example, an obstacle, skidding of the vehicle or slippery road surface) using the brake lights. The brake lights are not activated directly as a function of a recognized hazard, but hazard identification enters the brake light control indirectly according to the present invention via the formation of the threshold value. Thus, an active action (easing on the accelerator pedal) by the driver is required to activate the brake lights; i.e., the driver must first cause the brake lights to be activated by performing an action. This increases safety insofar as erroneous activation of the brake lights is concerned.

Due to the early and reliable activation of the brake lights, the trailing traffic is given more time to respond to a hazard, thereby reducing the potential of an accident.

In an advantageous embodiment of the present invention, the stability/safety parameter is a parameter derived from the driver-independent action on the brakes and/or the engine. The vehicle has a cruise control system, which adjusts at least one driving parameter, for example, the yaw rate and/or the yaw angle acceleration and/or the transversal acceleration of the vehicle, to a calculated target behavior at least through driver-independent intervention in the vehicle brakes and/or in the vehicle engine controller. The stability/safety parameter represents the occurrence of such an intervention. In particular, the stability/safety parameter represents the duration of such a dynamic intervention and/or the intensity of such an intervention.

In another advantageous embodiment of the present invention, the stability/safety parameter is a parameter derived from an obstacle located in front of the vehicle, in particular, the vehicle moving in front of it. The idea here, in particular, is that the vehicle has an adaptive cruise control which controls the distance between the vehicle and an obstacle, in particular, to a vehicle moving in front of it, via driver-independent actions on the vehicle brakes and/or the vehicle engine controller. The stability/safety parameter then represents the occurrence of such an action. Also in this exemplary embodiment, the stability/safety parameter represents the duration and/or the intensity of such an action.

In this case it is particularly advantageous if the stability/safety parameter represents the distance to the obstacle or the variation of this distance over time.

Furthermore, the stability/safety parameter can be a parameter derived from the friction conditions between the road surface and the vehicle tires.

This exemplary embodiment has the advantage that the parameters that are already available, depending on the equipment present in the vehicle, and do not need to be especially formed for activating the brake lights, can be used for changing the threshold value.

DETAILED DESCRIPTION

Figure 1:
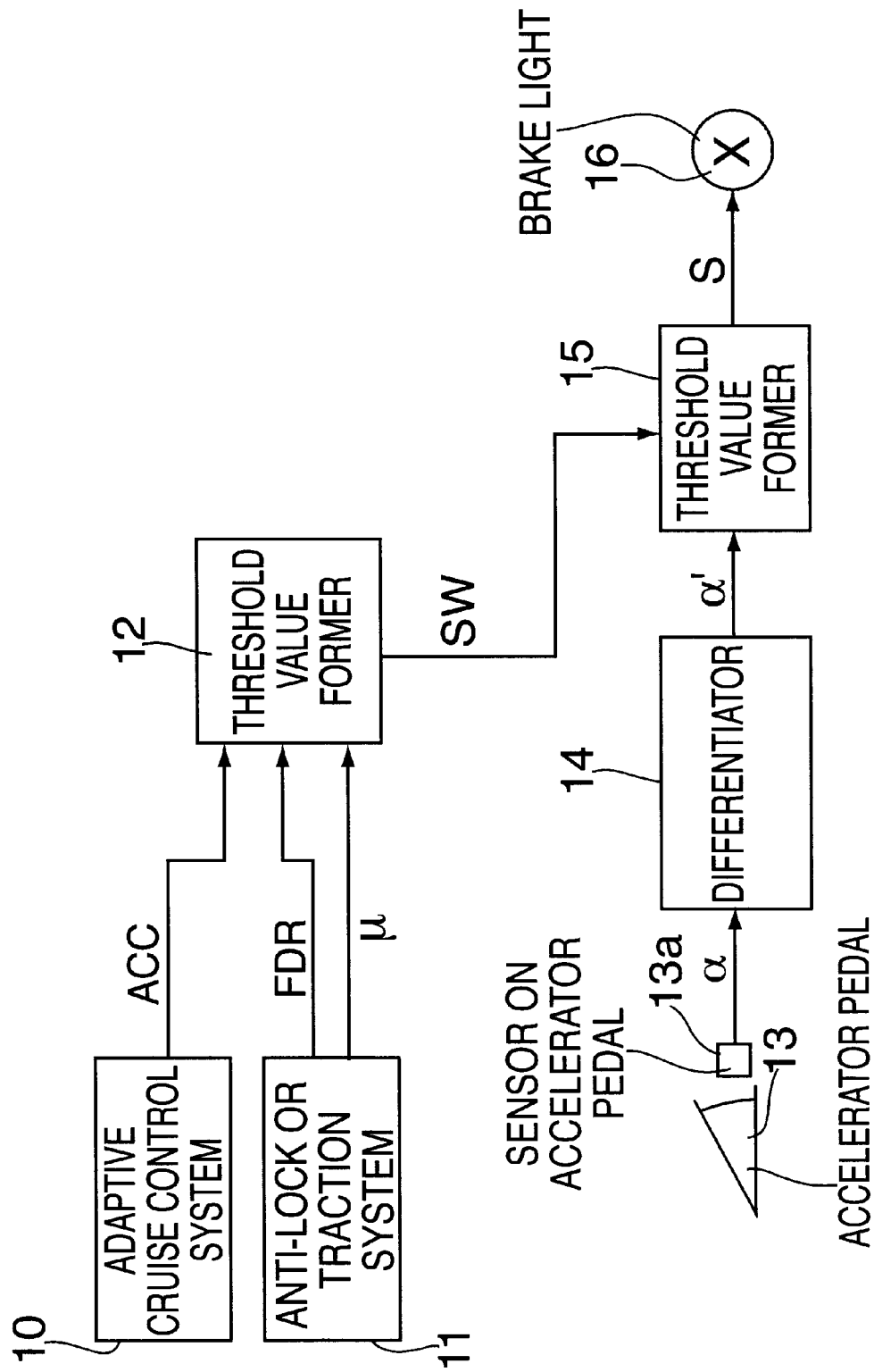
FIG. 1 shows an exemplary embodiment of a system according to the present invention.

FIG. 1 shows an accelerator pedal 13, actuated by the driver of the vehicle, with which the driver defines the propulsion of the vehicle (engine load and/or engine torque, drive torque and/or engine power, drive power). Position α of accelerator pedal 13 is detected by sensor 13a and supplied to differentiator 14, where variation α' over time of the accelerator pedal position, i.e., the accelerator pedal speed, is determined and supplied to threshold value comparator 15. For the subsequent evaluation, only the negative changes in the accelerator pedal position are relevant, i.e., those changes for which the accelerator pedal is eased up on to achieve less propulsion (engine load and/or engine torque, drive torque and/or engine power, drive power). Positive changes in the accelerator pedal position, i.e., changes in which the accelerator pedal is depressed, i.e., actuated in the direction of more propulsion (engine load and/or engine torque, drive torque and/or engine power, drive power), are filtered out in block 14.

Therefore, signal α' representing the rate at which the accelerator pedal is eased up on, i.e., in the direction of less propulsion (engine load and/or engine torque, drive torque and/or engine power, drive power), is obtained at the output of block 14.

In threshold value comparator 15, variation α' over time of the accelerator pedal position is compared with a threshold value SW, which is formed in block 12. If variation α' over time of the accelerator pedal position exceeds threshold value SW, brake lights 16 are activated via control signal S.

The adaptive cruise control, labeled as block 10, is equipped with sensors (not illustrated) to detect the obstacles located in front of the vehicle. The adaptive cruise control detects the distance to the obstacles located in front of the vehicle and their relative velocity. It selects, on the basis of additional sensor signals, the closest obstacle and, if necessary, reduces the speed of the vehicle equipped with adaptive cruise control. This is done by acting upon the engine controller and/or upon the brake controller of the vehicle.

Signal ACC supplied to threshold value former 12 displays whether or not such an action is taking place at the moment. The signal can be two-step (taking place/not taking place), multistep or continuous depending on the type (brake action or engine action) and intensity (strong/slight engine torque reduction and/or strong/slight braking action) of the action. Signal ACC represents, directly or indirectly, the distance to an identified obstacle located in front of the vehicle.

The yaw rate of the vehicle is basically measured in the cruise control system (block 11) mentioned in the preamble and it is compared with a target value derived from the longitudinal speed and the steering angle of the vehicle. If the measured yaw rate exceeds the respective target value, the yaw characteristic of the vehicle can be influenced by wheel-individual overbraking or underbraking and/or intervention in the engine controller to increase driving stability.

Signal FDR supplied to threshold former 12 displays whether or not such an intervention is taking place at the moment. The signal can be two-step (taking place/not taking place), multistep or continuous depending on the type (brake action or engine action) and intensity (strong/slight engine torque reduction and/or strong/slight braking action) of the action. Signal FDR can also directly display skidding of the vehicle, i.e., an unfavorable yaw and/or transversal motion behavior.

If the friction coefficient μ between the road surface and the vehicle tires is stored in block 11, which can be designed as a conventional anti-lock control or traction control system for this purpose, this coefficient is also supplied to threshold builder 12.

Then, the stronger the action of the adaptive cruise control, the lower is threshold value SW selected in block 12. Thus, the closer an obstacle is or the faster an obstacle approaches the vehicle (relative speed between obstacle and vehicle), the lower is threshold value SW selected in block 12.

As an alternative, the stronger an action of the cruise control system and/or the longer an action of the cruise control system lasts, the lower is threshold value SW selected in block 12.

Another option to warn the trailing traffic is to influence the threshold value former using friction coefficient μ. Thus, threshold value SW can be selected to be lower for an estimated low friction coefficient μ (for example, in the event of slippery ice) than in the event of a high μ (for example, dry road surface).

Thus, by influencing the threshold value, the driver must let up on the accelerator pedal with sufficient speed as before; the brake lights go on, however, faster in the case of an accident hazard due to the adjustment of threshold value SW to the hazard situation, whereby the trailing traffic is informed more promptly and the risk of an accident is avoided.

What is claimed is:

1. A method for generating a signal which activates brake lights of a motor vehicle, comprising the steps of:

determining a change value based on a change over time of a position of an accelerator pedal as the accelerator pedal is actuated by a driver;

detecting at least one current stability/safety parameter indicative of at least one of an instantaneous driving stability of the vehicle and an instantaneous driving safety of the vehicle;

determining, based on a magnitude of the detected current stability/safety parameter, at least one current threshold value;

comparing the change value and the at least one current threshold value; and generating the signal as a function of the comparison.

2. The method according to claim 1, wherein the at least one current stability/safety parameter indicates the occurrence of a driver-independent action on at least one of a brake and an engine.

3. The method according to claim 2, wherein the at least one current stability/safety parameter corresponds to the control, by a cruise control system of the vehicle, of at least one of the brake and the engine to adjust a driving condition parameter to a calculated target behavior.

4. The method according to claim 3 wherein the at least one driving condition parameter includes at least one of a yaw rate, a yaw acceleration, and a transverse acceleration of the vehicle.

5. The method according to claim 3, wherein the magnitude of the at least one current stability/safety parameter corresponds to a duration and an intensity of the at least one driver-independent action on the at least one of the brake and the engine.

6. The method according to claim 2, wherein the at least one current stability/safety parameter corresponds to the control, by an adaptive cruise control system of the vehicle, of at least one of the brake and the engine to adjust a distance between the vehicle and an obstacle.

7. The method according to claim 6, wherein the obstacle includes a further vehicle which is moving ahead of the vehicle.

8. The method according to claim 6, wherein the at least one current stability/safety parameter includes a duration and an intensity of the at least one driver-independent action on the at least one of the brake and the engine.

9. The method according to claim 1, wherein the at least one current stability/safety parameter corresponds to a distance between the vehicle and an obstacle, the obstacle being situated in front of the vehicle.

10. The method according to claim 9, wherein the obstacle includes a further vehicle which is moving in front of the vehicle.

11. The method according to claim 9, wherein the at least one current stability/safety parameter corresponds to a variation of the distance over a time period.

12. The method according to claim 1, wherein the at least one current stability/safety parameter corresponds to a friction condition between a road surface and a vehicle tire.

13. The method according to claim 1, wherein the at least one current stability/safety parameter is detected and the determination of the at least one current threshold value is automatically updated on a periodic basis.

14. The method according to claim 1, wherein the at least one current stability/safety parameter is detected and the determination of the at least one current threshold value is automatically performed when the chance value is determined.

15. A device for generating a signal which activates brake lights of a motor vehicle, comprising:

a first detector for detecting a current stability/safety parameter indicative of at least one of an instantaneous driving stability of the vehicle and an instantaneous driving safety of the vehicle;

a second detector for detecting a position of an accelerator pedal;

a processor coupled to the first and second detectors, the processor calculating a current threshold value as a function of the current stability/safety parameter and calculating a change value as a function of a change over time of the position of the accelerator pedal as the accelerator pedal is actuated by a driver, the processor comparing the change value to the current threshold value and generating the signal as a function of the comparison.

16. The device according to claim 15, wherein the current stability/safety parameter corresponds to the occurrence of a driver-independent action on at least one of a brake and an engine of the vehicle.

17. The device according to claim 15, wherein the at least one current stability/safety parameter corresponds to a distance between the vehicle and an obstacle, the obstacle being located in front of the vehicle.

18. The device according to claim 17, wherein the obstacle includes a further vehicle which is moving in front of the vehicle.

19. The device according to claim 15, wherein the at least one current stability/safety parameter corresponds to at least one friction condition between a road surface and a vehicle tire.

\* \* \* \* \*